(12) United States Patent
Jeong (10) Patent No.: US 10,075,639 B2
(45) Date of Patent: Sep. 11, 2018

(54) IMAGE ACQUIRING DEVICE AND PORTABLE TERMINAL COMPRISING SAME AND IMAGE ACQUIRING METHOD OF THE DEVICE

(71) Applicant: LG Innotek Co., Ltd., Seoul (KR)

(72) Inventor: Yu Kyeong Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/537,343

(22) PCT Filed: Dec. 17, 2015

(86) PCT No.: PCT/KR2015/013844
§ 371 (c)(1),
(2) Date: Jun. 16, 2017

(87) PCT Pub. No.: WO2016/099164
PCT Pub. Date: Jun. 23, 2016

(65) Prior Publication Data
US 2017/0359516 A1    Dec. 14, 2017

(30) Foreign Application Priority Data

Dec. 17, 2014  (KR) .......................... 10-2014-0182116

(51) Int. Cl.
*H04N 5/232*    (2006.01)
*H04N 5/335*    (2011.01)

(52) U.S. Cl.
CPC ..... *H04N 5/23248* (2013.01); *H04N 5/23212* (2013.01); *H04N 5/335* (2013.01)

(58) Field of Classification Search
CPC . H04N 5/23212; H04N 5/23248; H04N 5/335
See application file for complete search history.

(56) References Cited

U.S. PATENT DOCUMENTS 6,188,845 B1 *   2/2001  Sensui .................. G02B 7/346
                                                    396/114
6,670,992 B2 * 12/2003  Irie ..................... H04N 5/2351
                                                    348/345
(Continued)

FOREIGN PATENT DOCUMENTS

KR    10-2010-0085728 A    7/2010
KR       10-0974685 B1    8/2010
WO    WO-2014-156659 A1   10/2014

OTHER PUBLICATIONS

International Search Report in International Application No. PCT/KR2015/013844, filed Dec. 17, 2015.

*Primary Examiner* — Trung Diep
(74) *Attorney, Agent, or Firm* — Saliwanchik, Lloyd & Eisenschenk (57) ABSTRACT

An image acquiring device, according to one embodiment, comprises: an optical image stabilization unit which compensates for hand trembling; and optical unit which is controlled in accordance with the result value compensated in the optical image stabilization unit; an image sensor unit which converts optical information output from the optical unit into an electric signal; and image information processing unit which image processes the electric signal in accordance with the compensated result value; and an image information output unit which displays the image-processed result, wherein the image sensor unit comprises a plurality of phase difference detection pixels, and a plurality of image detection pixels disposed in a grid pattern along with the plurality of phase difference detection pixels, and the plurality of phase difference detection pixels comprise a first pixel group having a certain area shielded, the certain area being among an area separated by being partitioned in the vertical direction, and a second pixel group having a certain area shielded, the certain area being among an area separated (Continued)

by being partitioned in the horizontal direction, and thus the accuracy of focus may be increased by using a phase difference detection auto focus (AF) method even when an optical image stabilizer (OIS) is being driven.

20 Claims, 5 Drawing Sheets

(56) References Cited

U.S. PATENT DOCUMENTS

| | | | |
|---|---|---|---|
| 2008/0117325 A1* | 5/2008 | Nakagawa | G03B 13/36 348/345 |
| 2010/0188532 A1* | 7/2010 | Kusaka | H04N 5/23212 348/240.99 |
| 2011/0109776 A1* | 5/2011 | Kawai | H01L 27/14625 348/273 |
| 2012/0044406 A1* | 2/2012 | Shimoda | G02B 7/365 348/345 |
| 2012/0268613 A1 | 10/2012 | Nishio | |
| 2014/0071303 A1 | 3/2014 | Hasegawa | |

* cited by examiner

IMAGE ACQUIRING DEVICE AND PORTABLE TERMINAL COMPRISING SAME AND IMAGE ACQUIRING METHOD OF THE DEVICE

CROSS-REFERENCE TO RELATED APPLICATIONS

This application is the U.S. national stage application of International Patent Application No. PCT/KR2015/013844, filed Dec. 17, 2015, which claims priority to Korean Application No. 10-2014-0182116, filed Dec. 17, 2014, the disclosures of each of which are incorporated herein by reference in their entirety.

TECHNICAL FIELD

Embodiments relate to an image acquisition device including phase difference detection pixels, a portable terminal including the same, and an image acquisition method using the image acquisition device.

BACKGROUND ART

Increasing demand for high quality images for an image acquisition device such as a camera requires high-quality image acquisition technology. For example, adoption and application of an optical image stabilizer (OIS) for preventing image damage due to hand tremor have been attempted. Such an OIS is applied to cellular phones and small mobile devices in addition to digital cameras.

Furthermore, an auto focus (AF) system is widely used as a high-quality image acquisition technology. An AF system employing phase difference detection or contrast detection is one form of such an AF system.

Particularly, an AF system employing phase difference detection arranges a pair of focus detection pixels in an image sensor for focus control.

The AF system employing phase difference detection calculates a focus deviation by forming a pair of images using an image sensor in which focus detection pixels are arranged and measuring a distance between the formed images. Then, the AF system controls focus by predicting a movement amount of an image pick-up lens on the basis of the focus deviation and adjusting the position of the image pick-up lens on the basis of the movement amount. Such a phase difference detection AF system has been widely applied recently as a system having higher accuracy than a contrast detection system.

However, when the phase difference detection AF system and the OIS are simultaneously applied to an image acquisition device, an optical signal input to an image sensor becomes unstable when the OIS is driven for image stabilization, causing a problem that a phase difference value detected by the AF system differs from that detected when the OIS is not driven.

DISCLOSURE

Technical Problem

Embodiments provide an image acquisition device which secures accuracy of focus control detected from phase difference detection pixels of an image sensor unit even when an optical image stabilization unit is driven and an image acquisition method using the same.

Technical Solution

An image acquisition device according to an embodiment may include: an optical image stabilization unit for image stabilization; an optical unit controlled in accordance with an image stabilization result value obtained by the optical image stabilization unit; an image sensor unit for converting optical information output from the optical unit into an electrical signal; an image information processing unit for image-processing the electrical signal in accordance with the image stabilization result value; and an image information output unit for displaying an image-processed result, wherein the image sensor unit includes: a plurality of phase difference detection pixels; and a plurality of image detection pixels disposed in a grid pattern along with the plurality of phase difference detection pixels, wherein the plurality of phase difference detection pixels includes: a first pixel group having shielded areas among areas partitioned in the vertical direction; and a second pixel group having shielded areas among areas partitioned in the horizontal direction.

The image sensor unit may include a first arrangement line in which the first pixel group is disposed in the vertical direction and a second arrangement line in which the second pixel group is disposed in the vertical direction in the grid pattern.

The first arrangement line and the second arrangement line may be alternately arranged in the horizontal direction, and the image information processing unit may image-process an electrical signal of one of the first arrangement line and the second arrangement line.

The optical unit may be controlled in the vertical direction in accordance with the image stabilization result value. In this case, the image information processing unit may image-process electrical signals of the plurality of image detection pixels and the first pixel group.

The optical unit may be controlled in the horizontal direction in accordance with the image stabilization correction value. In this case, the image information processing unit may image-process electrical signals of the plurality of image detection pixels and the second pixel group.

A portable terminal according to an embodiment may include the image acquisition device according to an embodiment; a display unit for displaying an image acquired by the image acquisition device; and an input unit through which operation of the image acquisition device is controlled.

An image acquisition method using the image acquisition device according to another embodiment may include: performing image stabilization: generating optical information in accordance with an image stabilization result value; converting the optical information into an electrical signal; image-processing the converted electrical signal and the image stabilization result value; extracting electrical signals of one of the first pixel group and the second pixel group in accordance with the image stabilization result value fed back; and displaying the extracted electrical signals and electrical signals of the plurality of image detection pixels as an image.

Advantageous Effects

The image acquisition device and the image acquisition method using the same according to embodiments can improve focus accuracy according to phase difference detection AF by outputting values of some pixels selected from phase difference detection pixels in accordance with an image stabilization value of the optical image stabilization unit.

BEST MODE

Embodiments of the present invention for realizing the object of the present invention will be described with reference to the attached drawings.

Relational terms such as "first" and "second" and "upper" and "lower" used in the following description may be used to discriminate one entity or element from another entity or element without requiring or involving any physical or logical relationship or order between such entities or elements.

In the drawings, the thickness or size of each constituent element is exaggerated, omitted or schematically shown for convenience and clarity. Furthermore, the size of each constituent element does not reflect the actual size thereof.

Figure 1:
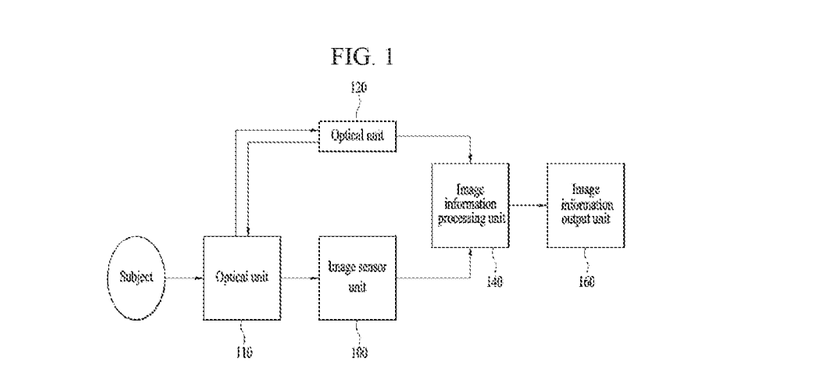
FIG. 1 is a block diagram illustrating an image acquisition device according to an embodiment.

FIG. 1 illustrates a configuration of an image acquisition device according to an embodiment. The image acquisition device 200 may include an optical unit 110, an optical image stabilization (OIS) unit 120, an image sensor unit 100, an image information processing unit 140 and an image information output unit 160.

The optical unit 110 may include a lens and a lens driver, absorb light input thereto and output the absorbed light to the image sensor unit 100 in order to acquire an image of a subject.

The lens may include a plurality of lenses and the position of each lens can be controlled by the lens driver. The lens driver may adjust the position of the lens to control a focal distance according to a control signal provided by the OIS unit 120 or the image information processor 140.

The OIS unit 120 may sense hand tremor that can occur when an image is captured and correct the image. The OIS unit 120 may include a sensor for sensing hand tremor, correct hand tremor sensed by the sensor and deliver a correction result value to the optical unit 110 to control the optical unit 110.

A gyro sensor may be used as the sensor included in the OIS unit 120 and can sense a degree to which an optical path of light input from the optical unit 110 changes due to hand tremor as an angular velocity.

The OIS unit 120 may divide a sensed hand tremor degree, that is, angular velocity values, into values in horizontal and vertical directions and move the optical unit 110 in the horizontal or vertical direction such that the optical unit 110 corresponds to the angular velocity values, thereby correcting hand tremor.

Optical information output from the optical unit 110 may be delivered to the image sensor unit 100.

The image sensor unit 100 may include an image sensor which receives optical information of a subject through the lens of the optical unit 110 and performs photoelectric conversion for converting the optical information into an electrical signal. The image sensor of the image sensor unit 100 may be a charge-coupled device (CCD) sensor or a complementary metal-oxide-semiconductor (CMOS) sensor.

The image sensor unit 100 may include a plurality of phase difference detection pixels 10 and 20 and a plurality of image detection pixels 30 disposed in a grid pattern along with the plurality of phase difference detection pixels 10 and 20.

The image detection pixels 30 may be pixels which generate electrical signals for generating image information of a captured image and the phase difference detection pixels 10 and 20 may be pixels which generate electrical signals for adjusting focus of a captured image.

Figure 2:
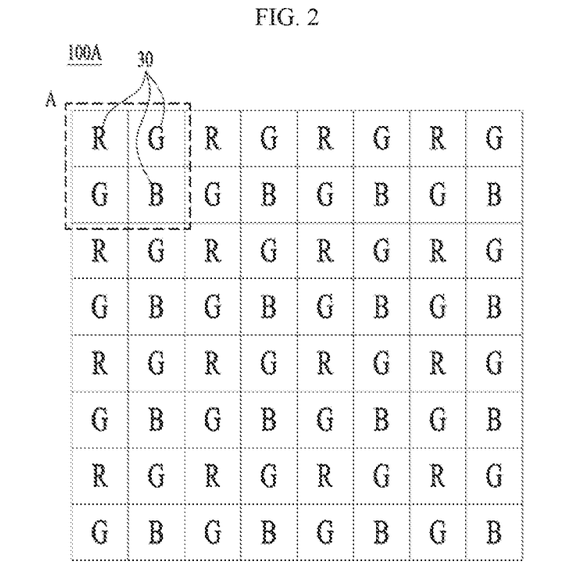
FIG. 2 illustrates an embodiment of an image sensor unit.

FIG. 2 illustrates an embodiment of an image sensor unit 100A including the image detection pixels 30.

The image detection pixels 30 may include a plurality of color pixels forming a grid unit which is repeated to form a grid pattern. The color pixels may include red, green and blue pixels. However, the present invention is not limited thereto.

R, G and B shown in FIG. 2 represent red, green and blue and the grid unit A may be a Bayer arrangement in which four pixels are arranged in two rows and two columns. Further, the grid unit may be a three-row three-column grid unit or a four-row four-column grid unit. However, the present invention is not limited thereto.

When the image detection pixels 30 form a grid pattern in which two-row two-column grid unit A is repeated, G pixels may be arranged as two diagonal pixels among four pixels constituting the grid unit A and R and B pixels may be arranged as the two remaining pixels.

Figure 3:
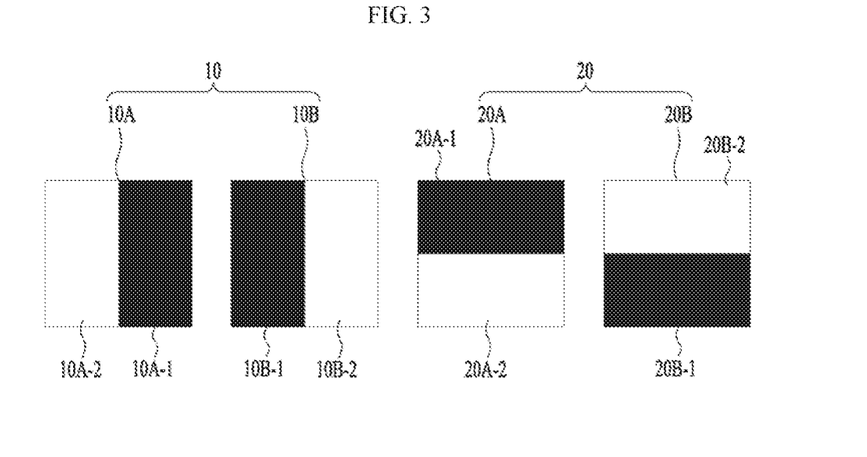
FIG. 3 illustrates an embodiment of phase difference detection pixels.

FIG. 3 is a plan view illustrating an embodiment of the phase difference detection pixels 10 and 20 included in the image sensor unit 100.

The phase difference detection pixels 10 and 20 may include a first pixel group 10 in which certain areas 10A-1 and 10B-1 obtained by partitioning pixel apertures in the vertical direction are shielded and a second pixel group 20 in which certain areas 20A-1 and 20B-1 obtained by partitioning pixel apertures in the horizontal direction are shielded.

The phase difference detection pixels 10 and 20 may have limited light-receiving areas obtained by shielding certain areas of apertures.

The phase difference detection pixels 10 and 20 may be arranged such that shielded areas are disposed in different directions.

For example, the first pixel group 10 may include a first group pixel 10A having a shield area disposed at the left side and a second group pixel 10B having a shielded area disposed at the right side, and the second pixel group 20 may include a third group pixel 20A having a shield area disposed at the upper side and a fourth group pixel 20B having a shielded area disposed at the lower side.

The phase difference detection pixels 10 and 20 may form a grid pattern along with the image detection pixels 30 and may be arranged at the positions of G pixels in the grid unit A of the image detection pixels 30.

Figure 4:
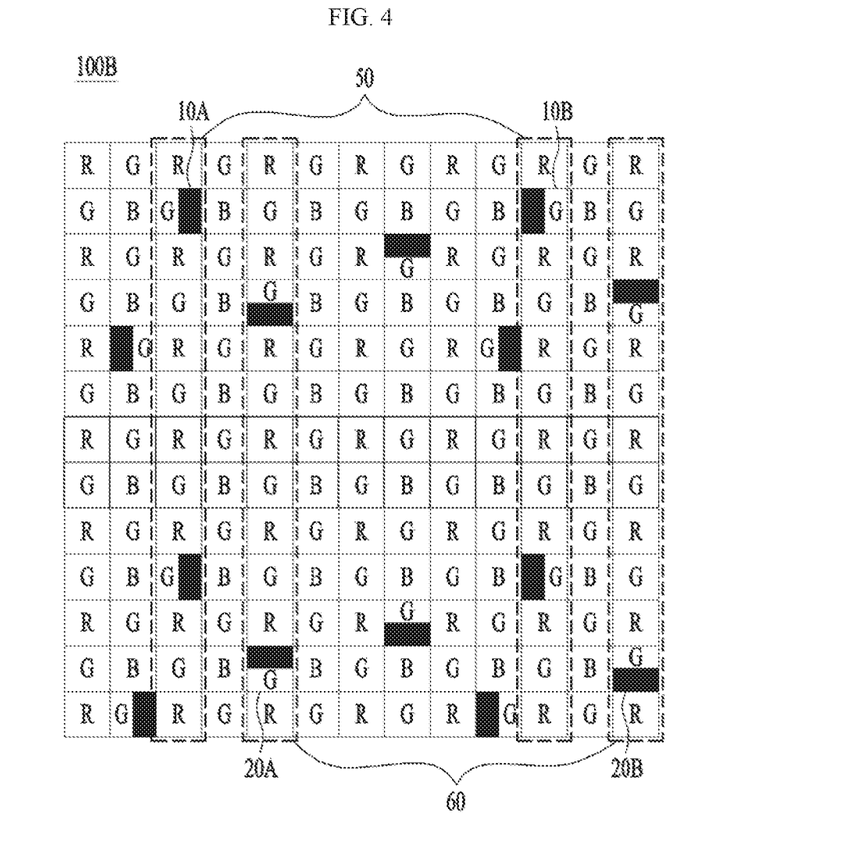
FIG. 4 illustrates an embodiment of an image sensor unit.

FIG. 4 illustrates an image sensor unit 100B according to an embodiment.

The image sensor unit 100B according to an embodiment of the present invention may include a first arrangement line 50 in which phase difference detection pixels of the first pixel group 10 are arranged in the vertical direction in a grid pattern and a second arrangement line 60 in which phase difference detection pixels of the second pixel group 20 are arranged in the vertical direction in the grid pattern.

The first arrangement line 50 may include at least one of the first group pixel 10A and the second group pixel 10B of the first pixel group 10 and the second arrangement line 60 may include at least one of the third group pixel 20A and the fourth group pixel 20B of the second pixel group 20.

The first arrangement line 50 and the second arrangement line 60 may be alternately arranged in the horizontal direction in the image sensor unit 100B. For example, the first arrangement line 50 and the second arrangement line 60 may be alternately arranged, or a plurality of first arrangement lines 50 may be arranged in the horizontal direction, a plurality of second arrangement lines 60 may be arranged following the first arrangement lines 50 in the horizontal direction, and this arrangement may be repeated in the horizontal direction.

FIG. 4 shows an embodiment of the image sensor unit 100B in which the first arrangement line 50 is arranged in two rows and the second arrangement line 60 is arranged in two rows.

The image sensor unit 100 may provide electrical signals generated through photoelectric conversion to the image information processing unit 140.

The image information processing unit 140 may perform image processing on the electrical signals supplied from the image sensor unit 100 in accordance with an image stabilization result value obtained by the OIS unit 120.

The image information processing unit 140 may generate image information from the electrical signals supplied from the image sensor unit 100 and provide the generated information to the image information output unit 160.

Image processing of the electrical signals in the image information processing unit 140 may be selective image processing of the electrical signals input from the image sensor unit 100 in response to the image stabilization result value.

For example, the image information processing unit 140 can generate image information for focus detection from electrical signals of one of the first pixel group 10 and the second pixel group 20 for phase difference detection in accordance with the image stabilization result value obtained by the OIS unit 120.

The image information processing unit 140 may perform image processing on electrical signals of one of the first arrangement line 50 and the second arrangement line 60 in accordance with the image stabilization result value fed back from the OIS unit 120 to acquire image information for focus detection.

When the OIS unit 120 corrects sensed hand tremor, the OIS unit 120 may control the optical unit 110 to move in the vertical direction or in the horizontal direction in response to a value corresponding to sensed hand tremor.

Data values shown in Table 1 are phase difference value deviations obtained through simulation when the image sensor unit 100B according to the aforementioned embodiment is applied.

TABLE 1

| Whether OIS is driven | Not driven | Move in horizontal direction | Move in vertical direction |
|---|---|---|---|
| Phase difference value deviation (pixel) | 0 | 6 | 0 |

Phase difference value deviations are based on phase difference values when the OIS unit 120 is not driven, and a phase difference value when the optical unit 110 is moved in accordance with an image stabilization result value obtained by the OIS unit 120 is compared with that when the OIS unit 120 is not driven and a difference therebetween is represented as the number of pixels.

When image information for focus detection from the electrical signals of the first pixel group 10 from among phase difference detection pixels is processed, accuracy of focus adjustment according to driving of the OIS unit 120 can be known from the result values shown in FIG. 1.

Referring to the result of Table 1, when the optical unit 110 is moved in the vertical direction according to control of the OIS unit 120, a deviation between a phase difference value obtained by image-processing the electrical signals of the first pixel group 10 of the image sensor unit 100 and a phase difference value obtained when the OIS unit 120 is not driven becomes zero, and thus driving of the OIS unit 120 may not affect phase difference values.

When the optical unit 110 is moved in the horizontal direction, a deviation between a phase difference value obtained by image-processing the electrical signals of the first pixel group 10 and a phase difference value obtained when the OIS unit 120 is not driven is 6, and thus it can be confirmed that driving of the OIS unit 120 affects calculation of a phase difference value.

Accordingly, the image acquisition device 200 according an embodiment feeds back information about a direction in which the optical unit 110 is controlled from the OIS unit 120 to the image information processing unit 140 in response to an image stabilization result value.

Here, the image acquisition device 200 may output phase difference detection image information from electrical signals of phase difference detection pixels 10 and 20 which are not affected by a movement direction of the optical unit 110 from among electrical signals of the phase difference detection pixels 10 and 20 input from the image sensor unit 100 in response to the fed back result value.

When the image acquisition device 200 of the aforementioned embodiment is used, accuracy of focus adjustment using a phase difference can be improved even when the OIS unit 120 is driven.

In the image acquisition device 200 according to an embodiment of the present invention, the optical unit 110 can be moved in the vertical direction according to an image stabilization result value.

Figure 5A:
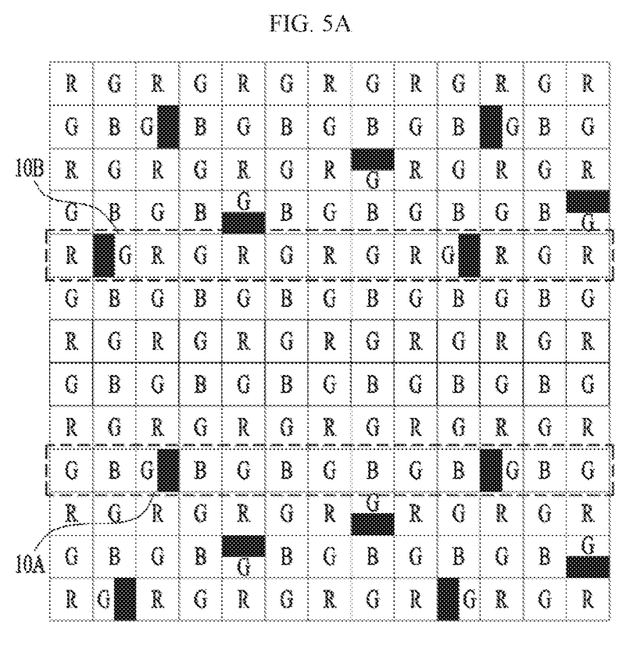
FIGS. 5a and 5b illustrate an embodiment regarding image processing of phase difference detection pixels according to control of an optical unit.

FIG. 5a illustrates image-processed phase difference detection pixels 10 when the optical unit 110 is controlled in the vertical direction.

In FIG. 5a, the image-processed phase difference detection pixels 10 are indicated by a dotted-line boundary. When the optical unit 110 is controlled in the vertical direction, the image information processing unit 140 can image-process electrical signals of the image detection pixels 30 and the phase difference detection pixels 10A and 10B of the first pixel group 10 of the image sensor unit 100B. For example, the image information processing unit 140 can calculate a phase difference value from electrical signal values input from phase difference detection pixels in which certain areas partitioned in the vertical direction are shielded and output image information for focus detection.

In the image acquisition device 200 of the embodiment, the optical unit 110 may be controlled in the horizontal direction according to an image stabilization result value.

Figure 5B:
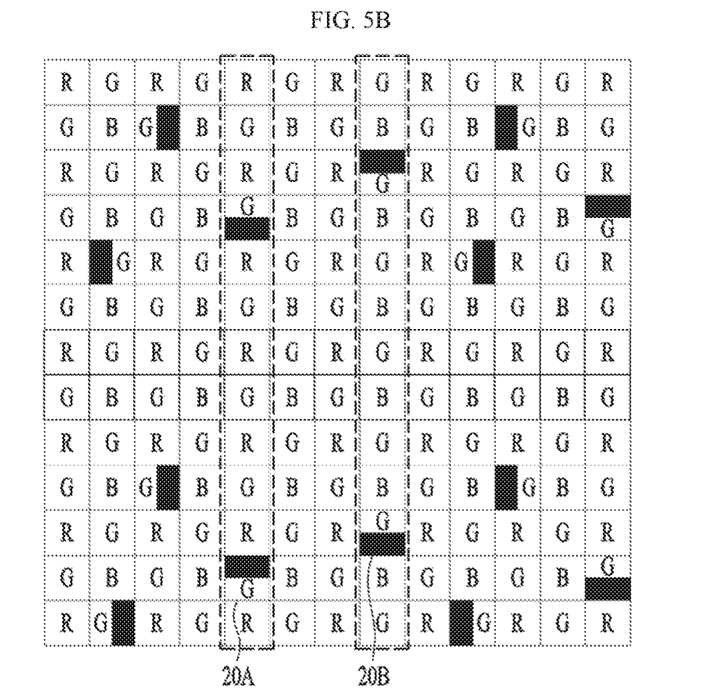

FIG. 5b illustrates image-processed phase difference detection pixels 20A, 20B when the optical unit 110 is controlled in the horizontal direction.

In FIG. 5b, the image-processed phase difference detection pixels 20A, 20B are indicated by a dotted-line boundary. When the optical unit 110 is controlled in the horizontal direction according to an image stabilization result value, the image information processing unit 140 can image-process electrical signals of the image detection pixels 30 and the phase difference detection pixels 20A and 20B of the second pixel group 20 of the image sensor unit 100. For example, the image information processing unit 140 can calculate a phase difference value from electrical signal values input from phase difference detection pixels in which certain areas partitioned in the horizontal direction are shielded and output image information for focus detection.

The image acquisition device 200 according to the embodiment of the present invention may perform AF control according to phase difference detection and can calculate a focus deviation on the basis of the image information for focus control, processed in the image information processing unit 140, and control driving of the optical unit 110 in response to the calculated focus deviation.

The image information output unit 160 may display image information supplied from the image information processing unit 140. The image information output unit 160 may provide visual image information to a user and may include a display unit such as a liquid crystal display (LCD) panel or an organic light-emitting diode (OLED) panel to display such image information.

Even when the optical unit 110 is controlled by the OIS unit 120, the image acquisition device 200 according to the embodiment can secure AF accuracy by performing focus adjustment through electrical signals selected from signals of phase difference detection pixels in accordance with a control result and can decrease phase difference detection AF error that can be generated when the OIS unit 120 is driven.

Figure 6:
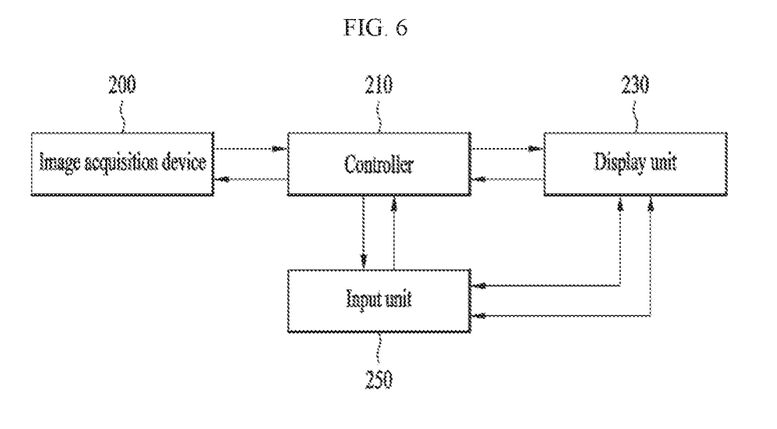
FIG. 6 illustrates an embodiment of a portable terminal.

FIG. 6 is a block diagram illustrating a configuration of an embodiment of a portable terminal 300 including the image acquisition device 200.

An embodiment of the portable terminal 300 may include the image acquisition device 200 according to the aforementioned embodiment, a display unit 230 for displaying images acquired by the image acquisition device and an input unit 250 through which operation of the image acquisition device 200 is controlled.

The portable terminal 300 may further include a controller 210 which delivers information input from the image acquisition device 200 to the display unit 230 to output the information or provides image information acquired by the image acquisition device 200 such that the image information is used for other functions of the portable terminal.

The controller 210 may control overall operation of the portable terminal 300.

For example, the controller 210 can control operation of the image acquisition device 200 or the display unit 230 according to a signal delivered through the input unit 250.

The controller 210 may control the display unit 230 to display image information acquired by the image acquisition device 200 and may store image information acquired by the image acquisition device 200 in an internal storage unit or an external storage unit (not shown) of the portable terminal 300 or transmit image information using a wireless communication method.

The display unit 230 may be a device which displays images acquired by the image acquisition device 200 such that a user can view the images and may be provided on the front side of the portable terminal. The display unit 230 may include a liquid crystal display (LCD), an organic light-emitting diode (OLED) display and the like. However, the present invention is not limited thereto.

The input unit 250 may be used to control operation of the portable terminal 300 including the image acquisition device 200 and the display unit 230 and may include a touch input unit or a button input unit. While methods of inputting information through the input unit 250 may include touch, tap, drag, gesture and the like, any method which can control operation of the portable terminal 300 can be used.

The portable terminal 300 according to the embodiment includes the image acquisition device 200 which performs phase difference detection AF using values of certain pixels selected from phase difference detection pixels in accordance with an image stabilization value of the optical image stabilization unit, and thus AF accuracy in image acquisition performed in the portable terminal 300 can be improved.

A description will be given of an image acquisition method using the above-described image acquisition device with reference to the attached drawings. However, embodiments are not limited thereto. That is, the aforementioned image acquisition device can be used in various manners.

Figure 7:
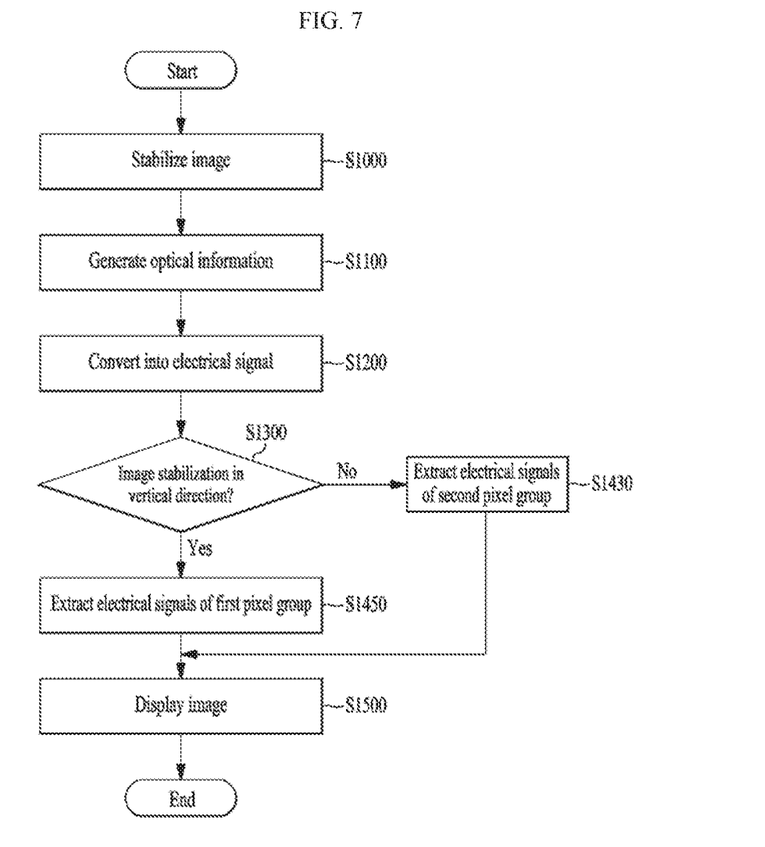
FIG. 7 is a flowchart illustrating an embodiment of an image acquisition method.

FIG. 7 is a flowchart illustrating an image acquisition method according to an embodiment.

Referring to FIG. 7, the image acquisition method according to an embodiment may include step S1100 of performing image stabilization, step S1100 of generating optical information in response to an image stabilization result value, step S1200 of converting the generated optical information into electrical signals, a step of image-processing the converted electrical signals and the image stabilization result value, steps S1430 and S1450 of extracting electrical signals of one of the first pixel group 10 and the second pixel group 20 in accordance with the image stabilization result value fed back, and step S1500 of displaying the extracted electrical signals and electrical signals of a plurality of image detection pixels as an image.

Step S1000 of performing image stabilization may include a step of sensing hand tremor through the sensor unit and a step of delivering an image stabilization value for moving the optical unit 110 in the vertical or horizontal direction in response to the sensed hand tremor from the OIS unit 120 to the optical unit 110

Step of S1100 of generating the optical information may be a step of generating an optical signal output from the optical unit 110 moved in response to sensed hand tremor in the image stabilization step S1000.

Step S1200 of converting the optical information into electrical signals may include a step of inputting the optical information output from the optical unit 110 to the image sensor unit 100 and converting the optical information into electrical signals in the image sensor unit 100. The step of converting the optical information into electrical signals in the image sensor unit 100 may be a step of converting optical information input to image detection pixels and phase difference detection pixels into electrical signals for outputting video information and image information for focus detection.

The step of image-processing the electrical signals converted in the image sensor unit 100 and the image stabilization result value of the OIS unit 120 may include a step of determining, by the image information processing unit 140, whether the optical unit 100 is driven in the vertical direction in accordance with the image stabilization result value.

The step of extracting electrical signals of one of the first pixel group 10 and the second pixel group 20 in accordance with the image stabilization result value fed back may be step S1450 of extracting electrical signals of the first pixel group 10 from among electrical signals of phase difference detection pixels converted in the electrical signal conversion step S1200 upon determining that the optical unit 110 is driven in the vertical direction in step S1300 of determining the direction of image stabilization in the image information processing unit or step S1430 of extracting electrical signals of the second pixel group 20 upon determining that the optical unit 110 is not driven in the vertical direction.

The image display step S1500 may be a step of displaying electrical signals of phase difference pixels extracted in the step of extracting electrical signals of one of the first pixel group 10 and the second pixel group 20 and electrical signals of image detection pixels converted in the image sensor unit 100.

When the OIS unit 120 and the phase difference detection AF system are simultaneously applied to the image acquisition device, the image acquisition method according to the embodiment can secure AF accuracy by reducing a phase difference deviation due to driving of the OIS unit 120.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

INDUSTRIAL APPLICABILITY

The image acquisition device and the image acquisition method using the same according to embodiments can output values of some pixels selected from phase difference detection pixels in response to a hand tremor correction value in the optical image stabilization unit, thereby improving focus accuracy according to phase difference detection AF.

The invention claimed is:

1. An image acquisition device comprising:
an optical image stabilization unit for image stabilization;
an optical unit controlled in accordance with an image stabilization result value obtained by the optical image stabilization unit;
an image sensor unit for converting optical information output from the optical unit into an electrical signal;
an image information processing unit for image-processing the electrical signal in accordance with the image stabilization result value; and
an image information output unit for displaying an image-processed result,
wherein the image sensor unit includes: a plurality of phase difference detection pixels; and a plurality of image detection pixels disposed in a grid pattern along with the plurality of phase difference detection pixels,
wherein the plurality of phase difference detection pixels includes: a first pixel group having shielded areas among areas partitioned in the vertical direction; and a second pixel group having shielded areas among areas partitioned in the horizontal direction;
wherein the optical unit is controlled in the vertical direction in accordance with the image stabilization result value, and
wherein the image information processing unit image-processes electrical signals of the plurality of image detection pixels and the first pixel group.

2. The image acquisition device according to claim 1, wherein the image sensor unit includes a first arrangement line in which the first pixel group is disposed in the vertical direction and a second arrangement line in which the second pixel group is disposed in the vertical direction in the grid pattern.

3. The image acquisition device according to claim 2, wherein the first arrangement line and the second arrangement line are alternately arranged in the horizontal direction.

4. The image acquisition device according to claim 2, wherein the image information processing unit image-processes an electrical signal of one of the first arrangement line and the second arrangement line.

5. The image acquisition device according to claim 1, wherein the optical unit is controlled in the horizontal direction in accordance with the image stabilization correction value.

6. The image acquisition device according to claim 5, wherein the image information processing unit image-processes electrical signals of the plurality of image detection pixels and the second pixel group.

7. A portable terminal comprising:
an image acquisition device that comprises an optical image stabilization unit for image stabilization, an optical unit controlled in accordance with an image stabilization result value obtained by the optical image stabilization unit, an image sensor unit for converting optical information output from the optical unit into an electrical signal, an image information processing unit for image-processing the electrical signal in accordance with the image stabilization result value, and an image information output unit for displaying an image-processed result, wherein the image sensor unit includes: a plurality of phase difference detection pixels; and a plurality of image detection pixels disposed in a grid pattern along with the plurality of phase difference detection pixels, wherein the plurality of phase difference detection pixels includes: a first pixel group having shielded areas among areas partitioned in the vertical direction; and a second pixel group having shielded areas among areas partitioned in the horizontal direction; wherein the optical unit is controlled in the vertical direction in accordance with the image stabilization result value, and wherein the image information processing unit image-processes electrical signals of the plurality of image detection pixels and the first pixel group;
a display unit for displaying an image acquired by the image acquisition device; and
an input unit through which operation of the image acquisition device is controlled.

8. The portable terminal according to claim 7 wherein the image sensor unit includes a first arrangement line in which the first pixel group is disposed in the vertical direction and a second arrangement line in which the second pixel group is disposed in the vertical direction in the grid pattern.

9. The portable terminal according to claim 8, wherein the first arrangement line and the second arrangement line are alternately arranged in the horizontal direction.

10. The portable terminal according to claim 8, wherein the image information processing unit image-processes an electrical signal of one of the first arrangement line and the second arrangement line.

11. The portable terminal according to claim 7, wherein the optical unit is controlled in the vertical direction in accordance with the image stabilization result value.

12. The portable terminal according to claim 11, wherein the image information processing unit image-processes electrical signals of the plurality of image detection pixels and the first pixel group.

13. The portable terminal according to claim 7, wherein the optical unit is controlled in the horizontal direction in accordance with the image stabilization correction value.

14. The portable terminal according to claim 13, wherein the image information processing unit image-processes electrical signals of the plurality of image detection pixels and the second pixel group.

15. An image acquisition device comprising:
an optical image stabilization unit for image stabilization;
an optical unit controlled in accordance with an image stabilization result value obtained by the optical image stabilization unit;
an image sensor unit for converting optical information output from the optical unit into an electrical signal;
an image information processing unit for image-processing the electrical signal in accordance with the image stabilization result value; and
an image information output unit for displaying an image-processed result;
wherein the image sensor unit includes: a plurality of phase difference detection pixels, and a plurality of image detection pixels disposed in a grid pattern along with the plurality of phase difference detection pixels;
wherein the plurality of phase difference detection pixels includes: a first pixel group having shielded areas among areas partitioned in the vertical direction, and a second pixel group having shielded areas among areas partitioned in the horizontal direction;
wherein the optical unit is controlled in the horizontal direction in accordance with the image stabilization correction value, and
wherein the image information processing unit image-processes electrical signals of the plurality of image detection pixels and the second pixel group.

16. The image acquisition device according to claim 15, wherein the image sensor unit includes a first arrangement line in which the first pixel group is disposed in the vertical direction and a second arrangement line in which the second pixel group is disposed in the vertical direction in the grid pattern.

17. The image acquisition device according to claim 16, wherein the first arrangement line and the second arrangement line are alternately arranged in the horizontal direction.

18. The image acquisition device according to claim 16, wherein the image information processing unit image-processes an electrical signal of one of the first arrangement line and the second arrangement line.

19. The image acquisition device according to claim 16, wherein the optical unit is controlled in the vertical direction in accordance with the image stabilization result value.

20. The image acquisition device according to claim 19, wherein the image information processing unit image-processes electrical signals of the plurality of image detection pixels and the first pixel group.

* * * * *